April 27, 1943.  O. E. ZODER  2,317,508
TRAILER TRUCK
Filed Oct. 4, 1940  4 Sheets-Sheet 1

Orren E. Zoder,
Inventor.
Haynes and Koenig
Attorneys

April 27, 1943.                 O. E. ZODER                    2,317,508
                                TRAILER TRUCK
                            Filed Oct. 4, 1940              4 Sheets-Sheet 2

Orren E. Zoder,
    Inventor.
Haynes and Koenig
    Attorneys.

April 27, 1943.     O. E. ZODER     2,317,508
TRAILER TRUCK
Filed Oct. 4, 1940     4 Sheets-Sheet 3
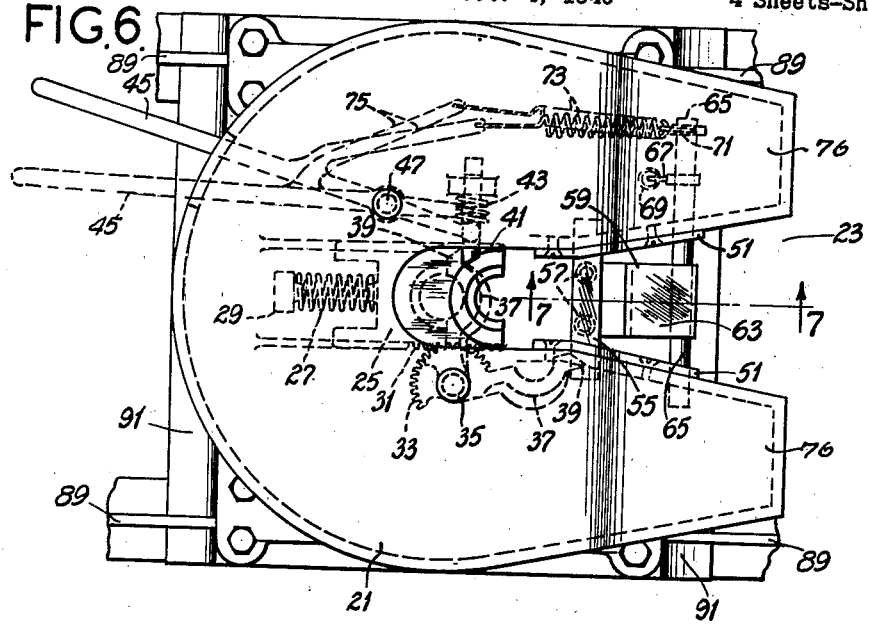
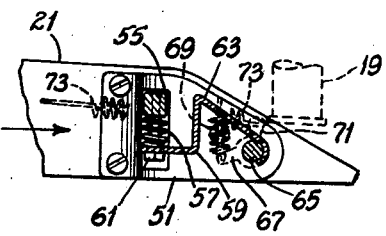
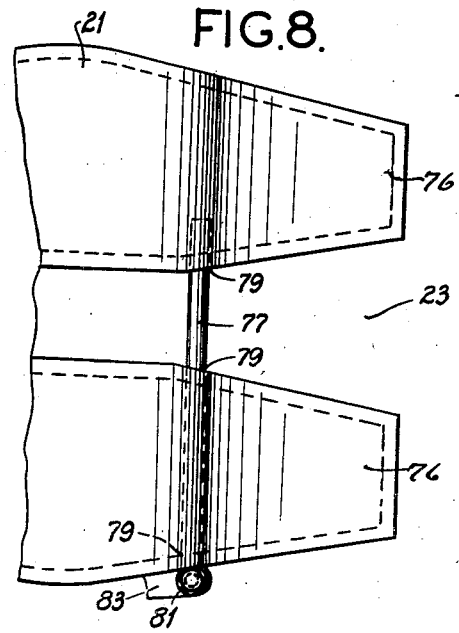
Orren E. Zoder,
Inventor
Haynes and Koenig
Attorneys April 27, 1943.   O. E. ZODER   2,317,508
TRAILER TRUCK
Filed Oct. 4, 1940   4 Sheets-Sheet 4

Orren E. Zoder,
Inventor.
Haynes and Koenig
Attorneys.

Patented Apr. 27, 1943

2,317,508

UNITED STATES PATENT OFFICE 2,317,508

TRAILER TRUCK

Orren E. Zoder, St. Louis, Mo., assignor to Zoder, Incorporated, St. Louis, Mo., a corporation of Missouri Application October 4, 1940, Serial No. 359,709

9 Claims. (Cl. 280—33.1)

This invention relates to trailer trucks, and with regard to certain more specific features, to couplings therefor.

Among the several objects of the invention may be noted the provision of an adjustable truck and trailer combination in which distribution of the load may be adjusted on the truck axles independently of adjustment on the trailer axle; the provision of apparatus of the class described which permits of increase in pay-load by adjusting its effect upon the truck axles, without the necessity for moving much, if any, of the load in the trailer body; the provision of apparatus of the class described which, while increasing said pay-load, effects a saving on truck tires by better load distribution on the truck than could heretofore be accomplished; the provision of apparatus of this class which permits of proper angling of the truck and trailer during road cruising operation and for so-called jack-knife and similar manipulations necessary for unloading; and the provision of coupling apparatus of this class which is safe and secure in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a side elevation of a trailer truck embodying the invention, the dotted lines showing an alternatively adjusted position;

Fig. 6 is a fragmentary view similar to Fig. 3, but on an enlarged scale, showing an open condition of certain coupling parts;

Fig. 7 is a vertical section taken on line 7—7 of Fig. 6;

Fig. 8 is a fragmentary plan view of an alternative embodiment of one phase of the invention;

Similar reference characters indicate corresponding parts throughout the several views of the drawings.

Hereinafter the terms "truck" and "tractor" are used synonymously.

When the trailer of a trailer truck combination is loaded, the operator uses his best judgment in respect to the weight indicated for the various pieces, to determine how to distribute them so that the wheel weight laws are not violated. Differences between actual and marked weights often result in a trailer being overloaded at one end or the other and this overloading is usually not determined until the vehicle has been filled, as determined by taking weight measurements at the wheels at some weighing station. When the trailer has a fixed coupling with the truck, in the case of error this results in the necessity for shifting the trailer load, which involves substantial manual labor. The present invention reduces or eliminates this labor.

Provision is also made hereby for permitting proper articulation of the truck or tractor and the trailer during road cruising operations (wherein only limited angling is necessary), and for articulation requiring greater angling, as during loading and unloading.

Variable articulations have been attempted for permitting various degrees of angling under various conditions, but these have not taken into consideration the desirability of load adjustments above referred to. Neither have they brought about the more equal tire wear, nor have they permitted increase in the pay-load by reason of better distribution of load.

The present invention also provides a safe coupling which, although the usual automatic features may fail, will prevent accidents.

Figure 1:
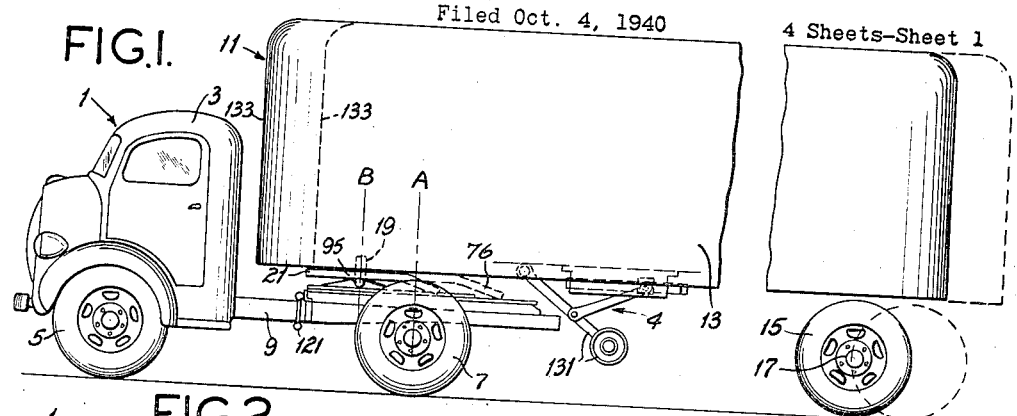

Referring now more particularly to Fig. 1, there is shown in general at numeral 1 a truck or tractor having a driver's cab 3, front steering wheels 5, rear driving wheels 7 and a frame 9. The rear wheels 7 are on suitable axles.

Numeral 11 indicates the trailer in general which consists of a load-carrying body 13 having road wheels 15 at the rear only on an axle 17. The front end of the trailer carries a king pin 19 which is supported in an automatic coupling of a so-called fifth wheel 21. The fifth wheel is carried upon the body 9, in a manner to be described. The coupling for the pin 19 will be described prior to describing the weight adjusting features.

Referring to Figs. 3–7, it will be seen that the fifth wheel 21 has a horse-shoe shape around an opening 23. At the rear of the opening 23 is a sliding block 25 which is normally pressed rearward by a spring 27 reacting from a fixed shoulder 29. The block 25 is provided with rack teeth 31 engaging a sector gear 33 pinned at 35 to the fifth wheel. An arm 37 extending from the sector gear 33 provides the other half of the bearing for which block 25 is a part. When the block 25 is sprung backward under action of spring 27, as shown in Fig. 6, the arm 37 is swung to one side as shown. The end of the arm 37 is provided with a dog 39 which is angled at the end to deflect a latch 41 when the gear 33 is swung counterclockwise, as when the block 25 is pushed forward (see Fig. 3).

The latch 41 is laterally slidable and is normally pressed into latching position by a spring 43. It may be drawn back by means of a handle 45 pivoted at 47 to the fifth wheel. When the arm is drawn into the dotted line position shown in Fig. 6, the latch 41 is drawn back. The handle may be so held by dropping it into a notch 46 (see Fig. 4). In the solid line position of handle 45 (Fig. 6) the spring 43 is effective to hold the latch 41 behind the dog 39, if the latter has been swung about into proper position. Coupling is effected simply by backing the tractor toward the king pin of the trailer so that the king pin contacts the member 25 whereupon the spring 27 is compressed. This rotates the gear 33 counterclockwise and closes the member 37 in around the king pin until it moves behind the latch 41 which automatically springs over to lock the coupling. In this event the handle 45 is in its solid-line position. To uncouple, the handle is placed in the dotted-line position, thus freeing the dog 39 of latch 41, whereupon the tractor may be pulled away.

While disconnected, the trailer is supported on a retractible supporting gear shown diagrammatically at 4. This gear is shown in retracted position in Fig. 1.

The difficulty with an automatic coupling of the class above described for king pin 19 is that if the coupling opens on the road the trailer is lost and a serious accident may occur. To obviate this I provide supporting blocks 51 on the tapered sides of the opening 23. In the blocks 51 are vertical guides 53. In the guides vertically slides a safety locking bar 55. This bar is supported by springs 57 on an oscillating control member 59. Suitable headed pillars 61 are used to hold the bar captive to the lever 59 against the expensive action of the springs 57.

The member 59 (which is in effect a lever) is provided with a cam surface 63 which slopes upwardly to the elevation of the upper level of the bar 55. At the lower end of the cam surface 63 the lever is affixed to a cross bar 65 which oscillates in bearings in plates 51. This rod 65 on one end carries a lever 67 for attachment to a coil spring 69. The other end of the spring 69 is fixed. The effect of the spring 69 is normally to bias the rod 65 clockwise (Fig. 7) and consequently to hold up the bar 55.

The rod 65 is also provided with a second lever 71 to which is attached a spring 73 extending to an arm 75 which is an extension from the control handle 45. Thus, when the control handle 45 is moved from the solid line position to the dotted line position shown in Fig. 6, not only is the member 37 released but the rod 65 is moved counterclockwise to depress the lock bar 55. Hence, when the tractor is moved away from the trailer, the bar 53 is depressed clear of the pin 19.

On the other hand, when it is desired to couple to the trailer, the lever 45 is left in its solid line position and the parts are as shown open in Figs. 6 and 7. When the tractor is moved backward with respect to the king pin 19, said king pin is at such an elevation (in view of the support 4) that the cam surface 63 contacts therewith. This causes downward deflection of lever 59 which draws down the lock bar 55 so that the king pin clears it, after which the king pin nests into the block 25 and pushes it back relatively to the fifth wheel against spring 27, thus rotating gears 33 and closing in the member 37 with the dog 39, to be locked behind the latch 41. It will thus be seen that the coupling operation is not at all complicated by the introduction of the bar 55.

The purpose of the springs 57 is to make the action of bar 53 more resilient when it strikes at the upper end of its travel.

The spring 73 is used for accommodating counterclockwise movement of the lever 71 (Fig. 7) as when the king pin 19 is being applied, whereby movement is accommodated without transmission to the lever 45. Spring 69 is simply a return spring.

Spring 73 is stronger than spring 69, whereby shaft 65 can be actuated against spring 69.

If, during operation on the road, something should occur to cause the latch 41 to release the member 37, the king pin can only slide back until it contacts with the bar 55. This will prevent uncoupling, as desired.

Figure 5:
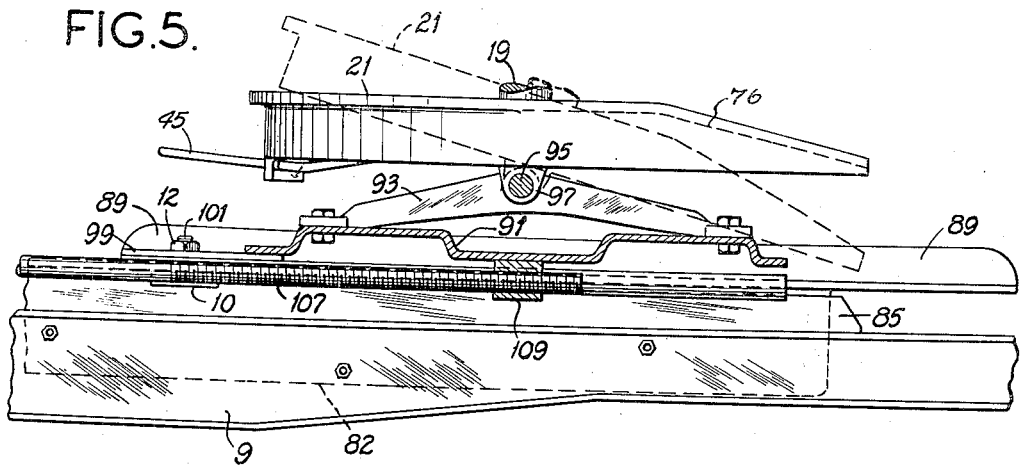
Fig. 5 is a vertical section taken on line 5—5 of Fig. 3, the fifth wheel parts being shown in elevation and also in dotted-line alternative position.

The dotted lines in Fig. 5 show the normal position of the fifth wheel 21 when the trailer is uncoupled. As coupling proceeds, the flat bottom of the trailer first levels the fifth wheel to the position shown in Fig. 5 after which the king pin proceeds through the coupling operation made clear above.

In Fig. 5 is illustrated the fact that the fifth wheel is swivelled on a lateral axle 95 and in dotted lines is shown its sloped position when the tractor backs into the trailer. Because of the solid line horizontal position of the fifth wheel when the parts are as shown in Fig. 7, there is a necessity for the operation of the bar-depressing cam 63. Incidentally, the fifth wheel also is provided with sloping cam surfaces 76 for guiding purposes. In Fig. 1 is shown how the set of supports 4 is folded when the trailer is connected. These are brought down before the tractor is moved away from the trailer.

In Fig. 8 is shown a simplified alternative embodiment of the above phase of the invention, which consists in a bar 77 manually pushed through openings 79 in the flanges of the fifth wheel after a coupling has been accomplished. This bar is then held in position by a bolt 81 which passes through an opening in it and through an opening in a side plate 83. This bar also acts as a safety for pin 19 but does not permit of automatic coupling because it is necessary to remove the bar before the tractor is backed into the trailer and to reapply it thereafter, Ordinarily a fifth wheel or its equivalent, such as 21, is fixed in position on the chassis 9 (except for swing about axle 95). Adjustments that have been suggested for re-orienting the trailer to permit maneuvering have been made with respect to this fixed fifth wheel. Another important phase of the present invention is the provision of an adjustment for re-orienting the trailer by moving the fifth wheel itself.

Figure 4:
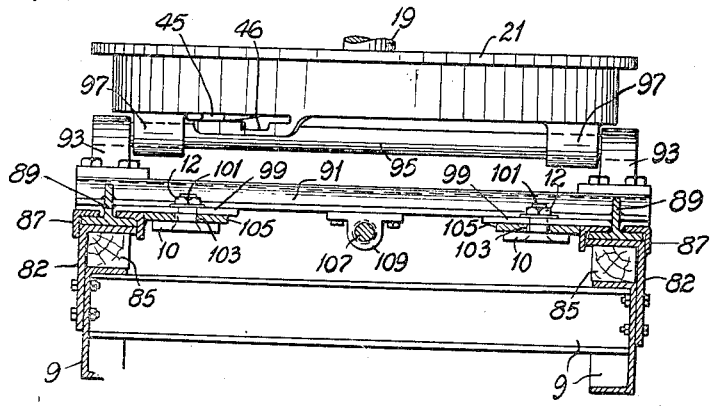
Fig. 4 is a vertical section taken on line 4—4 of Fig. 3, showing said fifth wheel.

Referring to Fig. 4, 82 indicates a fixed guide member attached to the chassis 9 and supported by blocks 85. Welded to the members 82 are upper guide lips 87 which, with the members 82, serve to form complete guides for sliding, T-shaped slide members 89.

The slides 89 have welded thereto a cross plate 91 on which are bearings 93 for the cross shaft 95 which passes through supporting lugs 97 on the fifth wheel.

Attached to the slides 89 and plate 91 are lateral extensions 99 carrying locking bolts 101. The bolts 101 extend through slots 103 in fixed extensions 105 from the fixed guide members 87. They have enlarged heads 10 and nuts 12. Thus the slides 89 together with the plates 91 and 99 may be locked in any desired longitudinal position by drawing up the nuts 12 on bolts 101, and conversely these nuts may be released to permit longitudinal adjustment of the slides 89.

Longitudinal adjustment is determined by a lead screw 107 which is threaded into a nut 109 carried on the bottom of the plate 91. The lead screw is supported at its front end in a bearing 111 and beyond this is provided with a bevel gear 113 meshing with a bevel gear 115 on a cross control shaft 117. The control shaft 117 is supported in bearings 119 on an extension 121 across the fixed members 87 and 105. A folding crank 121 consisting in a socket 123 is adapted to fit over the end 125 of the shaft and has an extension with slots 127 engaging a cross bolt 129. This crank is adapted to be moved axially with respect to the shaft 125 and pushed in so that the end 125 is in the socket 123, whereupon the crank may be rotated to drive the screw 107. Rotation may be in either direction. Rotation of the screw (after loosening of the bolts 101) results in shifting the center line of the shaft 95 forward or backward with respect to the center line of the rear wheels 7 of the tractor. After an adjustment has been made, the support for the fifth wheel is locked by tightening the nuts on the bolts 101.

Figure 2:
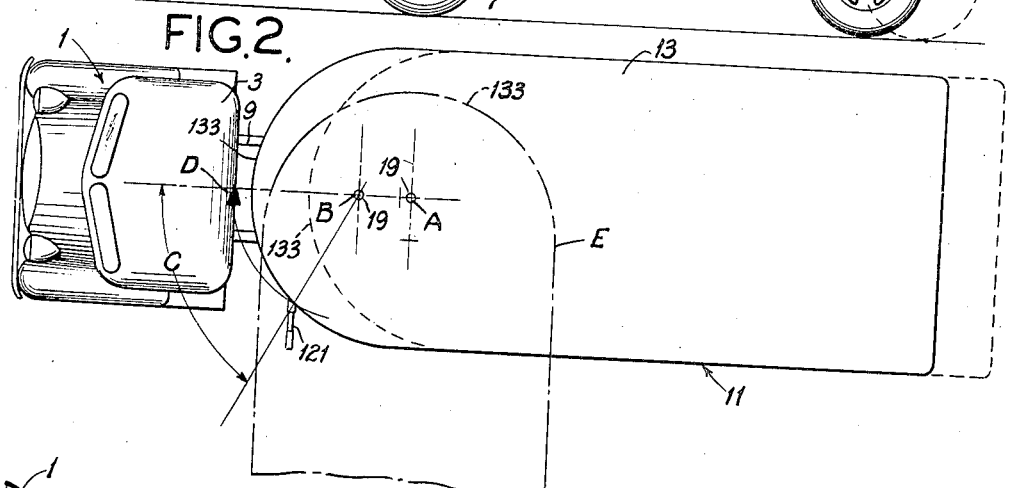
Fig. 2 is a plan view of Fig. 1, the added dot and dash lines showing an arrangement of relatively large angle or so-called jack-knife position.
Figure 3:
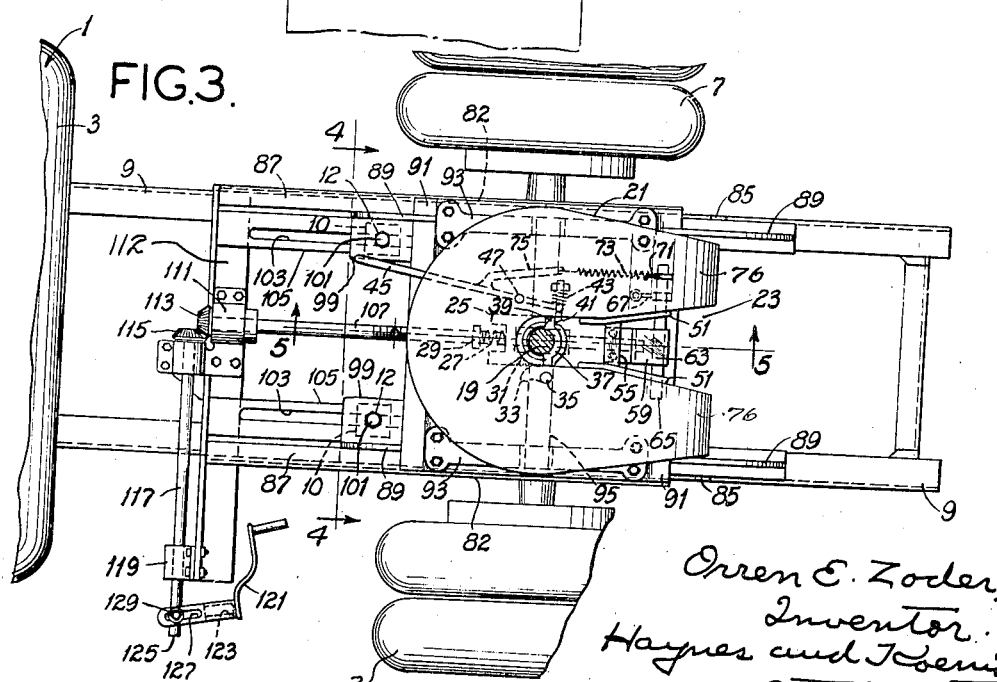
Fig. 3 is a plan view of the rear portion of the truck with all trailer portions removed except the king pin, and showing a locked condition of said king pin in a so-called fifth wheel.

Operation is as follows:

Asssume that the trailer has been loaded according to the best judgment of the operator, that is while the trailer is on its supports 131. This is arranged so that after backing in the tractor the loading is too much on the wheels 15 when the king pin 19 is over, or nearly over, the axle 17. To reduce the load on this axle 17, and in order to obtain a close coupling between truck and trailer, the operator loosens the bolts 101, turns the crank 121 and moves the center line of the king pin 19 from the position shown at A in Fig. 1 to position B (for example) ahead of the center line A. This will give him the desired close coupling and reduction in load on the axle 17. A close coupling is desirable for operations on the open road because of the reduced swinging and windage, resulting in better control by the driver. It permits of sufficient angular swing as indicated by the angle C shown in Fig. 2. The angle C is determined by the point at which the back of the cab 3 would be struck by the arcuate front 133 of the trailer, as indicated at D, and by the curved arrow. This is, for example, sufficient swing for road curves.

The swing shown by angle C is not sufficient for a relatively large angle or right angular relationship between the tractor and the trailer, that is, it is not sufficient for the so-called jack-knifing operation, necessary for turning the truck trailer around on a vertical center line through the middle of its rear axle. Therefore to avoid this interference under jack-knifing conditions the operator simply loosens the bolts 101, turns the crank 121, and moves the center line back from B to a position such as A. Then the desired jack-knife angular position may be accommodated without interference such as shown between the tractor and the dot and dash line E in Fig. 2. The possible angle of swing is then over 90°.

Regarding the feature of adjustably loading the axles while attaining close coupling for best driving conditions, it is clear that the load on the trailer axle 17 remains constant upon adjustment, but as shift is made from center line A to B the reaction by the truck driving wheels 7 becomes less, and the difference is made up by increased reaction or loading on the truck steerings wheels 5. This is desirable, because in most instances the steering wheels 5 are not loaded enough anyway, that is not near enough to the amount permitted by the road laws. Thus by partially shifting the load from wheels 7 to wheels 5, a better weight distribution is effected and the tire wear on these wheels is more evenly distributed. Prior adjustable couplings have not accomplished this end.

The present invention distinguishes from constructions in which the center line of the king pin or swivel is left at or near the axle 17 and trailer adjustments are made with respect thereto. These constructions only permit cab clearance under desired conditions, and do not succeed in permitting load adjustment (in addition to close coupling) after loading of the trailer. Therefore they do not relieve any overload on the rear driving wheels of the tractor. Particularly, they do not permit any such overloading on the rear axle to be transferred to the front wheels of the tractor. Conversely, applicant's adjustment permits of loading the trailer with a pay-load to a greater extent than heretofore. For example, the front end of the trailer may be overloaded with respect to an adjustment of the king pin to line A, and then adjustment made to line B, whereupon the wheels 7 are brought to legal loading and the loading increased on wheels 5 up to the legal point. Thus the pay-load may be substantially increased while close coupling is accomplished.

The trailer supports 4 are back of the king pin 19, and to the extent that their supporting point is different from the supporting point of the fifth wheel with respect to the trailer, there will be a change in load on the wheels 15 after a coupling is made, that is, the load will increase on these wheels 15. However, this can be anticipated, or any adjustment of load thereafter necessary to reduce the increased load on trailer wheels 15 may readily be made by unloading at the rear door of the trailer which is quite easily done, as distinguished from trying to shift the load up in the front end where there is no door. In other words, the operator tends, with the present invention, to load up the front end of the trailer solid, because he knows he can make an adjustment as between wheels 7 and 5 to make a proper load distribution. Then, if he has misjudged the loading on the rear wheels 15 so that upon coupling the increase is too much, he simply removes some of the load at the rear where the door is. As a matter of practice, an operator quickly acquires judgment so that he underloads the wheels 15 while loading on the support 4, to a degree which will prevent overloading on these wheels when a coupling is made.

From the above it will be seen that the invention permits not only of easily meeting all of the various laws on the subject of loading wheels and axles, but permits of increasing the pay-load within the law, while at the same time it accomplishes a short coupling between the tractor and the trailer during road operating conditions, and permits of adjustment to a long coupling for unloading. It will be understood that jack-knifing is ordinarily accomplished on private premises and at very low vehicle velocities, so that the question of weight laws is not paramount under these maneuvering conditions.

The terms "tractor" and "truck" are used herein in a generic sense to any pulling vehicle with front steering wheels and rear driving wheels on a chassis on which is a cab, and the term "trailer" to any unpowered vehicle which is drawn.

The term "fifth wheel" has been used herein for the platen member 21, since this is the term used in the art. It is to be understood that this is descriptive of any load-receiving platen which effects a swivelling connection after the load is applied.

One advantage of the invention is that the slide means 89 and the guide means 87 place the load directly in the planes of the side channels 9 of the truck chassis, rather than to one side of these. So far as the attachment plates 82 are concerned, these are shaped to follow the outlines of the sides of the channel irons 9 where axles and other parts of the truck need to be cleared.

Figure 9:
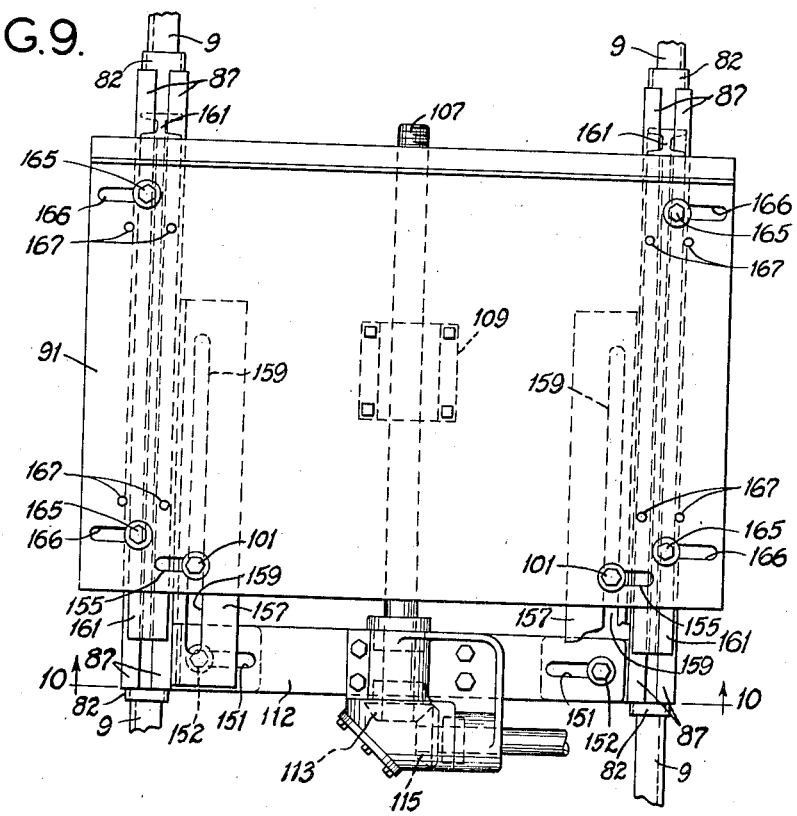
Fig. 9 is a plan view of parts showing an alternative form of the invention; and, Fig. 10 is a vertical section taken on line 10—10 of Fig. 9.
Figure 10:
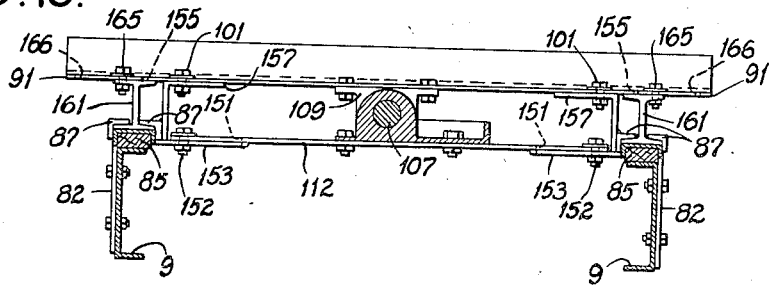

The form of the invention shown in Figs. 3–6 is adapted to given width of truck. For example, in Fig. 3 the supporting bar 112 is of fixed length and the plate 91 has a fixed attachment to the slides 89. In Figs. 9 and 10 is shown a form of the invention which in a given organization is adaptable to various truck widths. It retains the advantage of loading the truck in the plane of the side channels 9 and permits of shifting the position of the fifth wheel.

Referring to Figs. 9 and 10, like numerals designate like parts where applicable. In this case, the connection between the supporting bar 112 for the gear train 113, 115 is slotted as indicated at 151 for an adjustable connection by bolts 152 with fixed plates 153 forming extensions from the organizations of fixed members 82 and guides 87. Welding properly relates the parts where necessary.

The supporting plate 91 is slotted as indicated at 155 for adjustable lateral connection by means of bolts 101 with the fixed plates 157. The fixed plates 157 are the equivalent of plates 105 in Fig. 4, and carry slots 159 through which the bolts 101 also pass, so that longitudinal adjustments of plate 91 may be effected.

The supporting plate 91 is carried upon I-beam sliders 161 which are the equivalent of the inverted T-shaped slide members 89 of Fig. 4. Since the beams 161 are slidable with respect to the pairs of fixed angle irons 87 and since the distance apart of these pairs of angle irons depends upon the truck width, provision is made for relative adjustment between plate 91 and slides 161 by means of bolts 165 passing through slots 166 in 91 and suitable holes in the upper flanges of the I-beams 161.

In Figs. 9 and 10 no attempt has been made to show the fifth wheel or any of the supports therefor, and it will be understood that its supporting bearing blocks 93 are bolted at the openings 167. By means of this alternative construction, the device may be applied to any width of truck. The available adjustment at slots 151, 155 and 166 permits this. At the same time, the supporting plate 91 may be moved to any longitudinal position by loosening bolts 101 and it may be locked by tightening these at any point with respect to the grooves 159.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a trailer truck combination, the truck having front steering wheels and rear power wheels, the trailer having rear wheels and a fixed front king pin, a swivel support on said truck for said king pin, said support being non-adjustable with respect to the trailer after attachment but adjustable with respect to the truck, means for determining said adjustment from a point substantially near the center of the rear axle of the truck and to a point substantially ahead of the center of said axle, whereby the reaction load at the king pin of the trailer may be partially transferred from the rear wheels of the truck to said front steering wheels.

2. In a trailer truck combination, the truck having at the front a cab and steering wheels and at the rear power wheels, the trailer having at the front a king pin fixed in position on the trailer, the trailer having wheels at the rear, swivel means on the truck adapted to receive the king pin for swivelling, means for moving said swivelling means on the truck from the rearward point permitting relatively large angling, to a forward point close to the cab permitting because of said cab limited swivelling only at a smaller angle for road operation, said forward point being substantially ahead of the centers of the power wheels.

3. Supporting means for trailer truck swivel apparatus, comprising guide means affixed to the frame members of the truck, a driving mechanism, a support for the driving mechanism, means having an adjustable connection with said guide means, a supporting platen movable longitudinally by said driving mechanism, means slidably supporting said platen in the guide means, said supporting means and the platen having a laterally adjustable connection, and means for locking the platen at any longitudinal point with respect to the guide means, said last-named locking means accommodating the lateral adjustment between the platen and the guide means.

4. Supporting means for trailer truck swivels, comprising fixed members attached to the chassis side members of the truck including guides, slidable supports in the guides which are substantially co-planar with respect to said side members, a platen having at least one lateral slot for a laterally adjustable connection with one of said slidable supports, at least one of said fixed members having a longitudinal slot, a bolt connection between said platen and said longitudinal slot for longitudinal adjustment and locking, said bolt passing through a lateral slot in the platen.

5. Supporting means for trailer truck swivels, comprising fixed members attached to the chassis side members of the truck including guides, slidable supports in the guides which are substantially co-planar with respect to said side members, a platen having lateral slots for a laterally adjustable connection with said slidable supports, certain of said fixed members having longitudinal slots, bolt connections between said platen and said longitudinal slots for longitudinal adjustment and locking, said bolts passing through lateral slots in the platen.

6. Supporting means for trailer truck swivels, comprising fixed members attached to the chassis side members of the truck including guides, slidable supporting means in the guides which are substantially co-planar with respect to said channel members, a platen having lateral slots for a laterally adjustable connection with said slide supports, certain of said fixed members having longitudinal slots, bolt connections between said platen and said longitudinal slots for longitudinal adjustment and locking, said bolts passing through lateral slots in the platen, mechanical means for driving the platen for longitudinal adjustment, and means supporting said mechanical means and having a slotted connection for lateral adjustment with respect to said fixed members.

7. In a trailer truck combination in which the truck has a cab and also front steering wheels and rear power wheels and in which the trailer has rear wheels only, a fixed front king pin on the trailer, a movable support on the truck for detachable engagement by said king pin, normally operative means on the truck for moving said support at will from a rearward position to a position in which the king pin is located forwardly with respect to the axles of the rear power wheels of the truck to obtain as close a coupling of the trailer on the truck as is possible under ordinary road operation and wherein the front of the trailer will not interfere with said cab under the relatively small angles obtained in ordinary road operation, said movable support allowing for enough rearward movement of the trailer so that angling motion between the trailer and the truck during loading and unloading maneuvers is substantially greater than that allowed during said close coupling.

8. In a trailer truck combination, the truck having at the front a cab and steering wheels and at the rear power wheels on an axle, the trailer having at the front a fixed king pin and having wheels at the rear only, swivel means on the truck adapted to receive the king pin for swivelling, means for moving said swivelling means on the truck from a rearward point permitting relatively large angling, to a forward point close to the cab permitting because of said cab swivelling at a smaller angle for road operation, the moving means for the swivelling means being adapted to place the king pin which is fixed on the trailer substantially ahead of the center of the axle of said driving wheels on the truck so as more nearly to equalize the loading on all truck wheels without changing the load on the trailer wheels.

9. In a trailer truck combination, the truck having at the front a cab and steering wheels and at the rear power wheels on an axle, the trailer having at the front a fixed king pin and having wheels at the rear only, swivel means on the truck adapted to receive the king pin for swivelling, means for moving said swivelling means on the truck from a rearward point permitting relatively large angling, to a forward point close to the cab permitting because of said cab limited swivelling at a smaller angle for road operation, the moving means for the swivelling means being adapted to place the king pin which is fixed on the trailer substantially ahead of the center of said driving wheels on the truck so as more nearly to equalize the loading on all truck wheels, said connection between the king pin and the swivelling means being fixed with respect to the trailer so as not to affect the loading of the trailer wheels, regardless of said adjustment.

ORREN E. ZODER.